United States Patent
Ishitsuka (10) Patent No.: US 11,773,872 B2
(45) Date of Patent: Oct. 3, 2023

(54) DUCTED FAN DEVICE

(71) Applicant: HONDA MOTOR CO., LTD., Tokyo (JP)

(72) Inventor: Yuji Ishitsuka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 281 days.

(21) Appl. No.: 17/274,682

(22) PCT Filed: Jun. 20, 2019

(86) PCT No.: PCT/JP2019/024553
§ 371 (c)(1),
(2) Date: Mar. 9, 2021

(87) PCT Pub. No.: WO2020/070927
PCT Pub. Date: Apr. 9, 2020

(65) Prior Publication Data
US 2022/0034332 A1    Feb. 3, 2022

(30) Foreign Application Priority Data

Oct. 4, 2018  (JP) .................................. 2018-188795

(51) Int. Cl.
*F04D 29/54* (2006.01)
*B64C 27/20* (2023.01)
(Continued)

(52) U.S. Cl.
CPC ............ *F04D 29/545* (2013.01); *B64C 27/20* (2013.01); *B64D 27/24* (2013.01); *F04D 25/06* (2013.01); *F04D 29/526* (2013.01)

(58) Field of Classification Search
CPC .... F01D 21/045; F04D 29/526; F04D 29/545; B64C 27/20; F05D 2300/603; B64D 27/24; B32B 3/08
See application file for complete search history.

(56) References Cited

U.S. PATENT DOCUMENTS 4,377,370 A * 3/1983 Porcelli ................. F01D 21/045
                                                           415/121.2
6,979,172 B1   12/2005 Mackenzie
(Continued)

FOREIGN PATENT DOCUMENTS

JP    2001003750 A    1/2001
JP    2002332843 A    11/2002
(Continued)

OTHER PUBLICATIONS

English translation of International Search Report for PCT Application PCT/JP2019/024553 dated Aug. 13, 2019; 4 pp.

*Primary Examiner* — Kenneth J Hansen
(74) *Attorney, Agent, or Firm* — Armstrong Teasdale LLP (57) ABSTRACT

A ducted fan device provides enhanced containment capability resulting from a Fan Blade Out (FBO) event. The fan device includes an annular fan shroud (52) and an electric motor disposed at the center driving at least one fan blade (58, 64). The fan shroud (52) has a multilayer structure including a fiber layer (74) and a resin layer (70, 72). The shroud has an opposing section (A) that opposes a tip of at least one of the fan blades (58, 64) and a non-opposing section (B) that does not oppose the tips of the fan blades (58, 64). The opposing and non-opposing sections are arranged in the axial direction. In the non-opposing section (B), the fiber layer (74) is impregnated with part of resin forming the resin layer (70, 72). In the opposing section (A), the fiber layer (74) is not impregnated with the resin forming the resin layer (70, 72).

9 Claims, 10 Drawing Sheets

(51) Int. Cl.
  *B64D 27/24* (2006.01)
  *F04D 25/06* (2006.01)
  *F04D 29/52* (2006.01)

(56) References Cited

U.S. PATENT DOCUMENTS

2015/0118036 A1* 4/2015 Ohtani .................... F01D 25/24
  415/200
2019/0136711 A1* 5/2019 Worthoff ............... F04D 29/023
2019/0203735 A1* 7/2019 Hoefler ................. F04D 19/002

FOREIGN PATENT DOCUMENTS

| | | |
|---|---|---|
| JP | 2013124646 A | 6/2013 |
| JP | 2017120172 A | 7/2017 |
| WO | 2009108477 A1 | 9/2009 |
| WO | 2013191070 A1 | 12/2013 |

* cited by examiner

DUCTED FAN DEVICE

CROSS-REFERENCE TO RELATED APPLICATIONS

This application is a U.S. National Phase Application of PCT/JP2019/024553, filed Jun. 20, 2019, which claims the benefit of priority to Japanese Patent Application No. 2018-188795, filed Oct. 4, 2018, the contents of which are hereby expressly incorporated by reference in their entirety.

TECHNICAL FIELD

The present invention relates to a ducted fan device, and more specifically relates to a ducted fan device having a containment function at the time of FBO (Fan Blade Out).

BACKGROUND ART

As a ducted fan device having a containment function at the time of FBO, in which fan blade fragments generated by fracture of a fan blade during fan rotation are thrown in the centrifugal direction, there is known a ducted fan device having a cylindrical fan case that is composed of resin-impregnated composite material containing mutually parallel oriented fibers in a matrix resin and accommodates a rotating fan blade therein, wherein the fiber orientation is set at an angle intersecting a projection line obtained by projecting the tip of the fan blade onto the inner circumferential surface of the fan case (an angle in a range of 90 degrees±30 degrees), so that the impact when the tip of the fan blade thrown at the time of FBO collides with the inner circumferential surface of the fan case is absorbed efficiently by the fibers and the fan blade fragments that have been thrown are contained in the fan case (for example, Patent Document 1).

As another ducted fan device having a containment function at the time of FBO, there is known a ducted fan device including a cylindrical fan case that is composed of resin-impregnated composite material containing fibers and resin and accommodates a rotating fan blade therein, and a cylindrical restraining member that is composed of resin impregnated composite material containing fibers and resin and provided on the outer circumference of the fan case like a hoop, wherein the resin content ratio of the restraining member is set lower than the resin content ratio of the fan case so that the thrown fan blade fragments are captured by the restraining member (for example, Patent Document 2).

PRIOR ART DOCUMENT(S)

Patent Document(s)

[Patent Document 1] JP2013-124646A
[Patent Document 2] WO2013/191070A1

SUMMARY OF THE INVENTION

Task to be Accomplished by the Invention

The resin impregnated composite material constituting the fan case or the restraining member is highly brittle and may be broken by the fan blade fragments thrown at the time of FBO, and in order to enhance the containment capability at the time of FBO, it is necessary to increase the wall thickness of the fan case and the restraining member. This hinders the weight reduction of the ducted fan device.

A task to be accomplished by the present invention is to enhance the containment capability of a ducted fan device at the time of FBO without hindering the weight reduction thereof.

Means to Accomplish the Task

A ducted fan device (10) according to one embodiment of the present invention is ducted fan device comprising a fan shroud (52) having an annular shape in plan view and an electric fan disposed at a center of the fan shroud (52) and having a fan blade (58, 64), wherein the fan shroud (52) has a multilayer structure including at least one fiber layer (74, 86, 88) and at least one resin layer (70, 72, 80, 82, 84, 98), and has an opposing section (A) including a part that opposes a tip of the fan blade (58, 64) and a non-opposing section (B) that does not oppose the tip of the fan blade (58, 64), the opposing section and the non-opposing section being arranged in an axial direction, and wherein in the non-opposing section (B), the fiber layer (74, 86, 88) is impregnated with part of resin forming the resin layer (70, 72, 80, 82, 84, 98), and in the opposing section (A), the fiber layer (74, 86, 88) is not impregnated with the resin forming the resin layer (70, 72, 80, 82, 84, 98).

According to this configuration, the fiber layer (74) in the opposing section (A) is not impregnated with resin and has high flexibility and elasticity derived from the physical properties of the fibers constituting the fiber layer (74), whereby the fiber layer does not easily suffer brittle fracture and favorably captures the fan blade fragments. Thereby, it becomes unnecessary to increase the wall thickness of the fan shroud (52) to enhance the containment capability at the time of FBO, and the containment capability at the time of FBO is enhanced without hindering the weight reduction of the ducted fan device (50).

In the ducted fan device (10), preferably, the resin layer (70) is provided only on a radially outer surface of the fan shroud (52).

According to this configuration, owing to the minimum laminated structure, the containment capability at the time of FBO is enhanced without hindering the weight reduction of the ducted fan device (50).

In the ducted fan device (10), preferably, the resin layer (70, 72) is provided on each side of the fiber layer (74).

According to this configuration, the fiber layer (74) is not exposed to the outside, and thus, foreign matters are prevented from adhering to the fiber layer (74).

In the ducted fan device (10), preferably, multiple fiber layers (86, 88) and multiple resin layers (80, 82, 84) are provided alternately.

According to this configuration, the containment capability at the time of FBO is even more enhanced due to the presence of multiple fiber layers (86, 88).

In the ducted fan device (10), preferably, the resin layer (70, 72, 80, 82, 84) comprises a thermosetting resin.

According to this configuration, a resin layer (70, 72, 80, 82, 84) having a high mechanical strength can be obtained easily due to the thermosetting resin.

In the ducted fan device (10), preferably, the resin layer (70, 72) is formed of a prepreg.

According to this configuration, molding of the fan shroud (52) is facilitated.

In the ducted fan device (10), preferably, of the at least one resin layer (70, 98), a resin layer (98) disposed most inward in a radial direction of the fan shroud (52) is formed of a foamed resin.

According to this configuration, the resin layer (98) is readily broken at the time of FBO so that fan blade fragments are captured by the fiber layer (74) in a favorable manner.

In the ducted fan device (10), preferably, a resin insulation sheet (76, 78, 92, 94, 96) that inhibits impregnation of the resin into the fiber layer (74, 86, 88) is disposed between the fiber layer (74, 86, 88) and the resin layer (80, 82, 84) in the opposing section (A).

According to this configuration, due to the resin insulation sheet (76, 78, 92, 94, 96), a structure in which the fiber layer (74) in the opposing section (A) is not impregnated with resin can be obtained easily and reliably.

In the ducted fan device (10), preferably, the fiber layer (74, 86, 88) consists of a plain or twill woven fabric made of at least one of polymer fibers and carbon fibers.

According to this configuration, the fiber layer (74, 86, 88) acts like a net to capture the fan blade fragments at the time of FBO.

Effect of the Invention

In the ducted fan device according to the present invention, the containment capability at the time of FBO is enhanced without hindering the weight reduction.

MODES FOR CARRYING OUT THE INVENTION

One embodiment of a multicopter to which a ducted fan device according to the present invention is applied will be described with reference to FIGS. 1 and 2.

The multicopter 10 of this embodiment has a machine body 12. The machine body 12 includes a main machine body 14 having a rectangular box shape elongated in the fore and aft direction, a front machine body 16 having a truncated pyramidal box shape which extends forward from the front end of the main machine body 14 and is progressively narrower in lateral width toward a front end part thereof, a rear machine body 18 having a truncated pyramidal box shape which extends rearward from the rear end of the main machine body 14 and is progressively narrower in lateral width toward a rear end part thereof, a left machine body 20 having a rectangular box shape elongated in the fore and aft direction and connected to the left side of the main machine body 14, and a right machine body 22 having a rectangular box shape elongated in the fore and aft direction and connected to the right side of the main machine body 14.

The front machine body 16 and the rear machine body 18 are arranged along a center line extending in the fore and aft direction of the main machine body 14, and are symmetric to each other in the fore and aft direction. The left machine body 20 and the right machine body 22 are located on either lateral side of the main machine body 14, and each have a height approximately half the height of the main machine body 14. The left machine body 20 and the right machine body 22 are in bilaterally symmetric to each other.

The main machine body 14, the left machine body 20, and the right machine body 22 each have a box shape and receive a power source battery (not shown) therein.

A box-shaped seat stand 24 is mounted on the main machine body 14. An occupant seat 26 is attached to the seat stand 24 so as to face forward. A fixed handle 30 including left and right grips 28 for an occupant seated on the occupant seat 26 is attached to a front part of the seat stand 24. A flight control unit (not shown in the drawings) is provided in the vicinity of the fixed handle 30 or the occupant seat 26.

On the seat stand 24, a three-axis gyro sensor 32, a three-axis acceleration sensor 34, a flight control unit 36, and an autonomous flight control unit 38 are mounted. The gyro sensor 32 is disposed at the gravitational center G of the machine body 12 or at a position close to the gravitational center G in plan view so that the attitude control of the machine body 12 is performed easily and appropriately.

Legs 40 having runners elongated in the fore and aft direction are attached to a lower part of the machine body 12.

Figure 2:
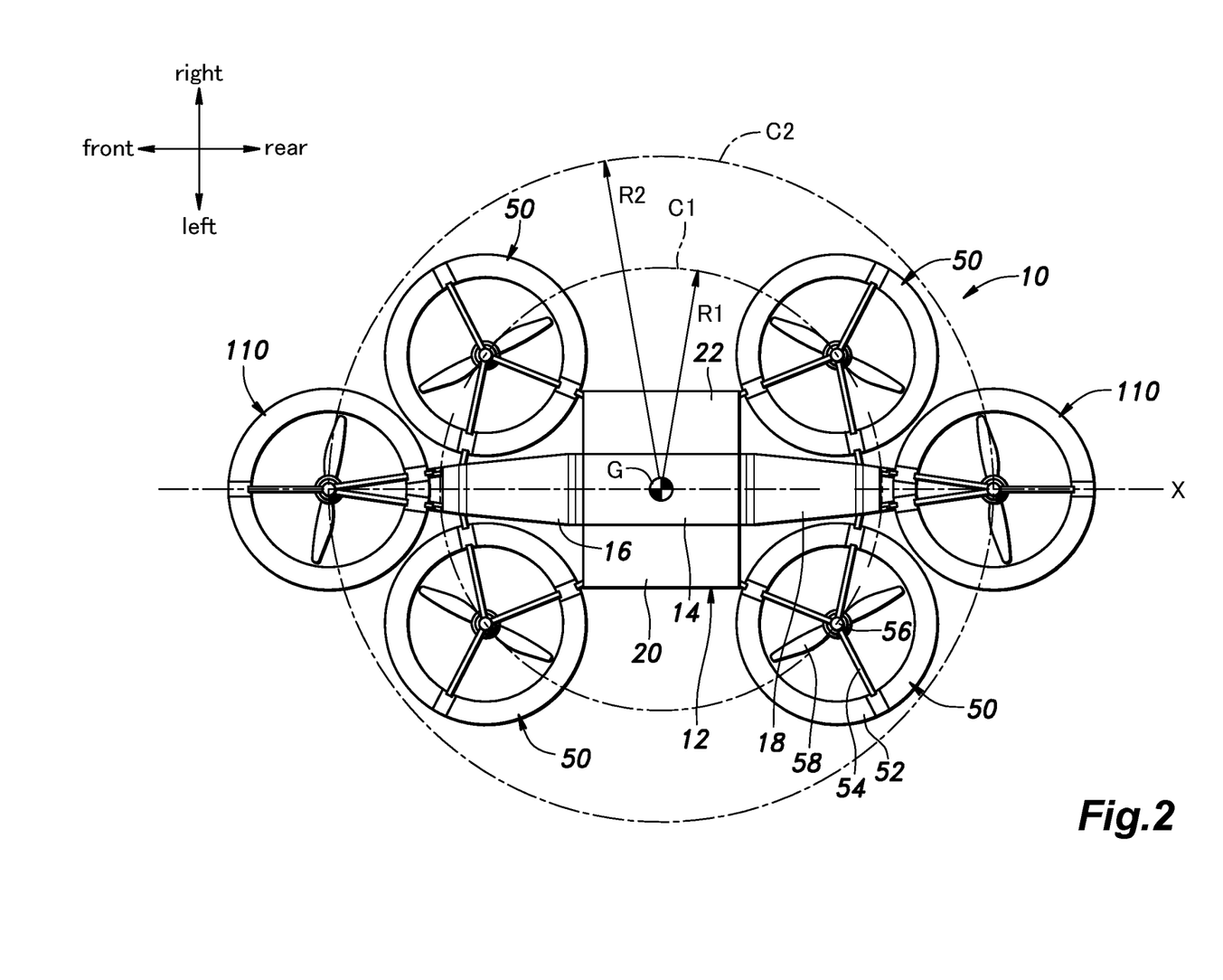
FIG. 2 is a plan view of the multicopter of the present embodiment.

As shown in FIG. 2, the multicopter 10 is provided with four first ducted fan devices 50 arranged on a first concentric circle C1 centered substantially around the gravitational center G of the machine body 12 and having a radius R1 in a front part and a rear part of the machine body 12 in a bilateral symmetry, and two second ducted fan devices 110 arranged on a second concentric circle C2 centered substantially around the gravitational center G of the machine body 12 and having a larger diameter than the first concentric circle C1 (namely, having a radius R2 greater than the radius R1) on a front side and a rear side of the machine body 12 along a central axis X extending in the fore and aft direction of the machine body 12. The first ducted fan devices 50 and the second ducted fan devices 110 serve as lift generators attached to the machine body 12.

Figure 1:
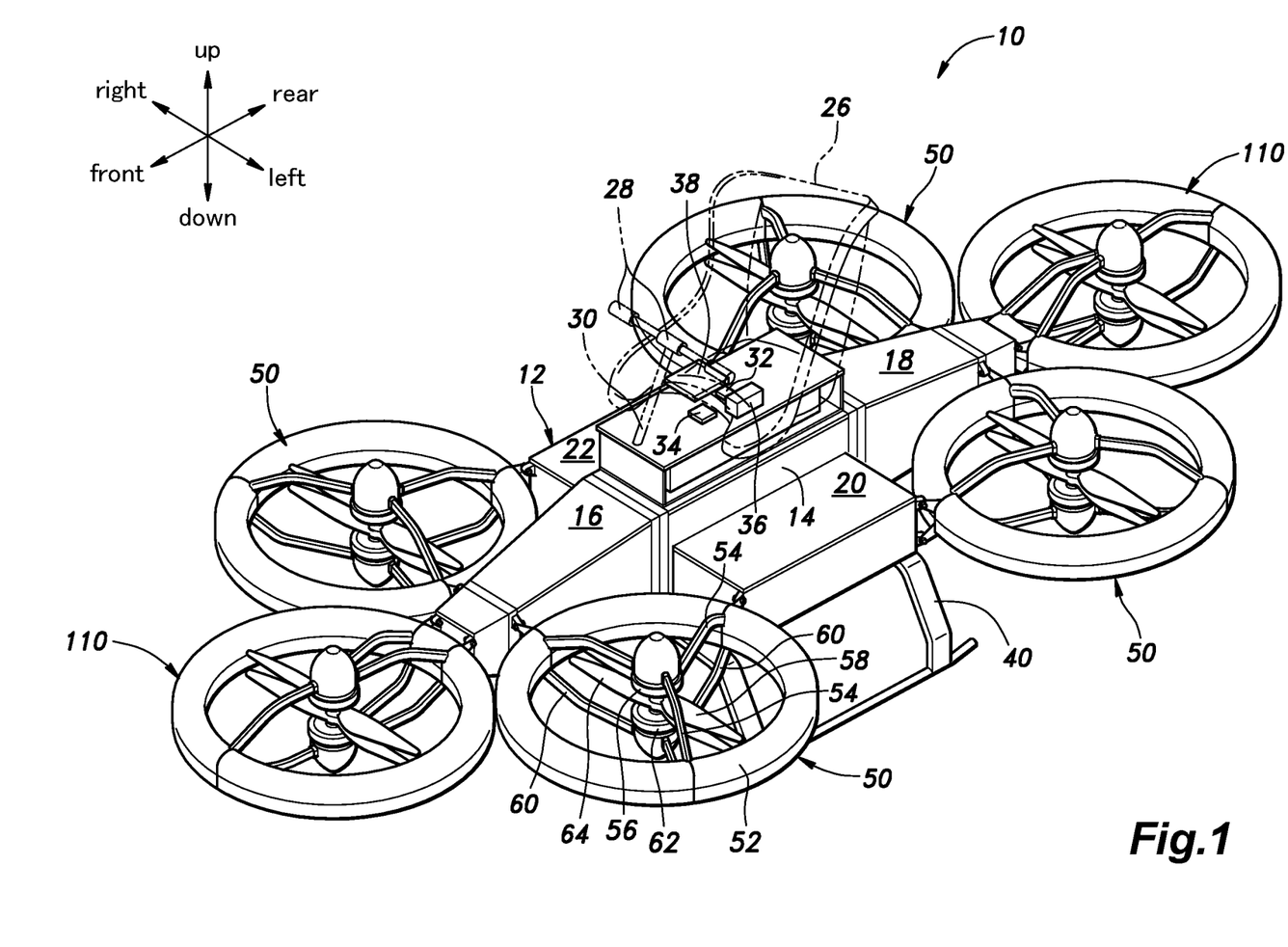
FIG. 1 is a perspective view showing one embodiment of a multicopter to which a ducted fan device according to the present invention is applied.

As shown in FIG. 1, each first ducted fan device 50 of the first embodiment includes counter-rotating blades arranged concentrically one above the other, and includes an annular fan shroud (duct) 52 attached to the machine body 12 and having an open upper end and an open lower end, an upper electric motor 56 disposed at the center of the fan shroud 52 by multiple upper arms 54, an upper fan blade (rotating blade) 58 fitted to a rotary shaft of the upper electric motor 56 to face downward and driven to rotate by the upper electric motor 56, a lower electric motor 62 disposed coaxially with the upper electric motor 56 by multiple lower arms 60, and a lower fan blade 64 fitted to a rotary shaft of the lower electric motor 62 to face upward and driven to rotate by the lower electric motor 62. The upper fan blade 58 and the lower fan blade 64 are coaxially arranged to vertically oppose each other with a space therebetween and rotate in mutually opposite directions. The combination of the upper electric motor 56 and the upper fan blade 58 and the combination of the lower electric motor 62 and the lower fan blade 64 each form an electric fan.

Figure 3:
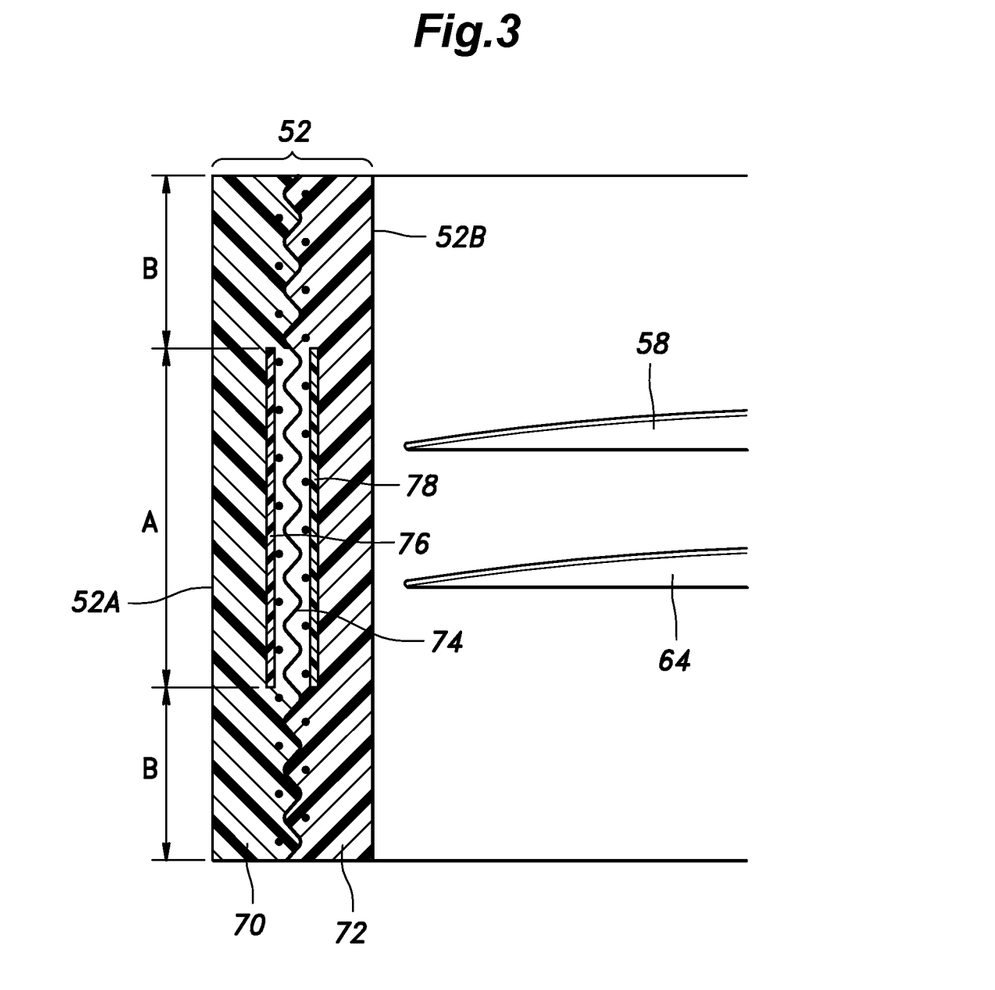
FIG. 3 is an enlarged sectional view of a main part of the ducted fan device according to the first embodiment.

As shown in FIG. 3, the fan shroud 52 has a multilayer structure which includes an outer resin layer 70 constituting an outer circumferential surface 52A of the fan shroud 52, an inner resin layer 72 constituting an inner circumferential surface 52B of the fan shroud 52, and a fiber layer 74 sandwiched between the outer resin layer 70 and the inner resin layer 72. Namely, the resin layers (the outer resin layer 70 and the inner resin layer 72) are provided on both sides of the fiber layer 74.

The fan shroud 52 has, in the axial direction (the vertical direction as viewed in FIG. 3), an opposing section A including a part that opposes the tips of the upper fan blade 58 and the lower fan blade 64 and non-opposing sections B that vertically adjoin the opposing section A and do not oppose the tips of the fan blades 58, 64. The opposing section A is defined depending on the the region to which blade fractures of the upper fan blade 58 and the lower fan blade 64 will be thrown at the time of FBO.

The outer resin layer 70 and the inner resin layer 72 are each made of a thermosetting resin, such as epoxy resin (EP), a prepreg having fibrous reinforcement material such as glass fibers, carbon fibers or the like impregnated with matrix resin consisting of a thermosetting resin, or the like. Since the outer resin layer 70 and the inner resin layer 72 are composed of a thermosetting resin, the outer resin layer 70 and the inner resin layer 72 can easily have high mechanical strength.

Figure 4:
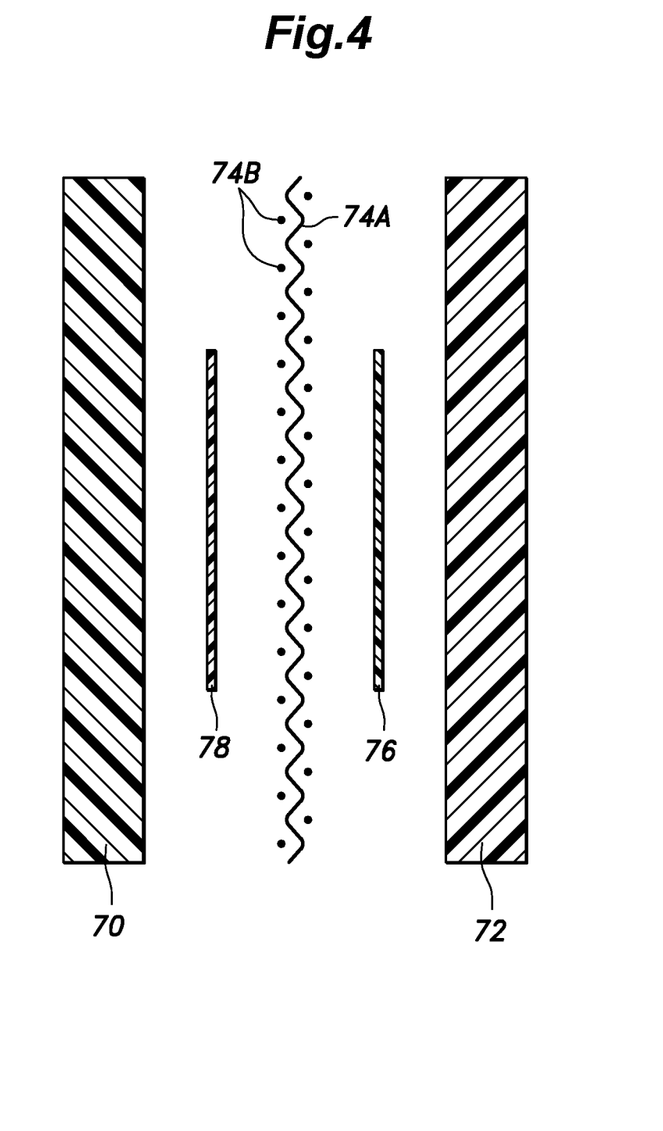
FIG. 4 is an exploded sectional view of a fan shroud of the ducted fan device according to the first embodiment.

FIG. 4 shows an exploded state of the outer resin layer 70 and the inner resin layer 72 before thermosetting in the case where the resin layers are each composed of a prepreg. The use of the prepreg facilitates molding of the fan shroud 52.

Figure 5:
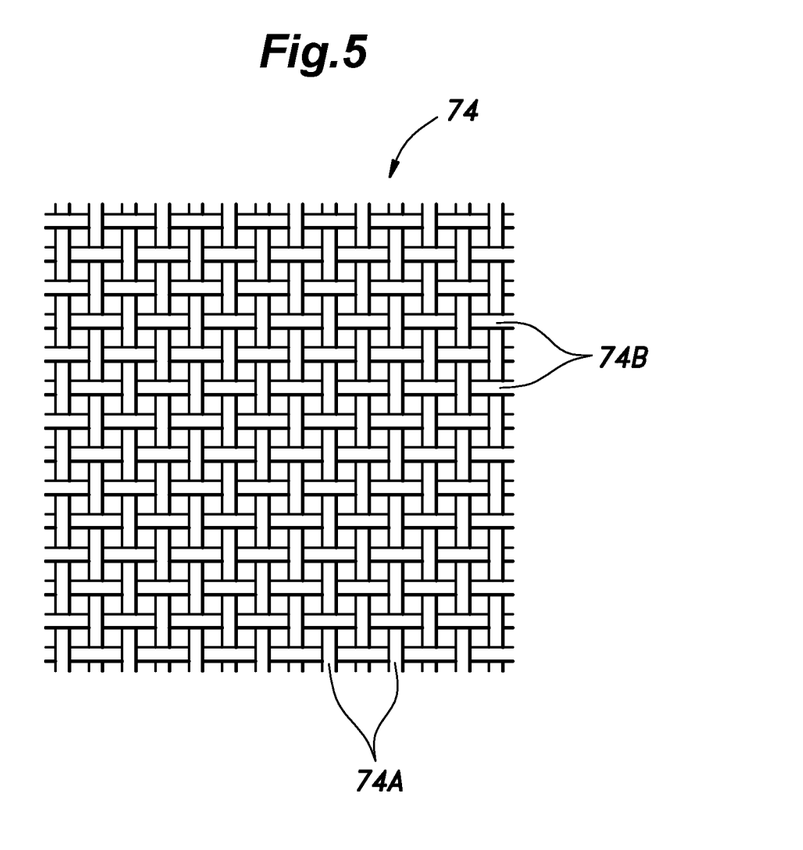
FIG. 5 is an enlarged plan view of a woven fabric used in the fan shroud of the ducted fan device according to the first embodiment.

The fiber layer 74 is composed of a woven fabric of polymer fibers made of aramid resin or the like and carbon fibers. As shown in FIG. 5, the fiber layer 74 may preferably be a plain or twill woven fabric whose warp 74A is composed of aramid fibers (APF) and weft 74B is composed of carbon fibers.

In the non-opposing sections B of the fan shroud 52, the fiber layer 74 is impregnated with part of the resin forming the outer resin layer 70 and the inner resin layer 72, and the outer resin layer 70 and the inner resin layer 72 are welded to each other with the fiber layer 74 interposed therebetween.

In the opposing section A of the fan shroud 52, the fiber layer 74 is not impregnated with the resin forming the outer resin layer 70 and the inner resin layer 72. In the opposing section A, resin insulation sheets 76, 78 are disposed between the fiber layer 74 and the outer resin layer 70 and between the fiber layer 74 and the inner resin layer 72, respectively. The resin insulation sheets 76, 78 are each composed of a sheet of closed cell foamed resin such as polymethacrylimide (PMI) resin or the like, and inhibit the resin in the outer resin layer 70 and the inner resin layer 72 from impregnating into the fiber layer 74 at the time of molding. By using the resin insulation sheets 76, 78, a structure in which the fiber layer 74 in the opposing section A is not impregnated with resin can be obtained easily and reliably.

Since the fiber layer 74 in the opposing section A is not impregnated with the resin of the outer resin layer 70 and the inner resin layer 72, the fiber layer 74 in the opposing section A has high flexibility and elasticity derived from the physical properties of the fibrous material (woven fabric) constituting the fiber layer 74.

In the fan shroud 52 having the above-described configuration, since the fiber layer 74 in the non-opposing sections B is impregnated with part of the resin forming the outer resin layer 70 and the inner resin layer 72 and the outer resin layer 70 and the inner resin layer 72 are welded to each other with the fiber layer 74 interposed therebetween, high strength and rigidity can be achieved.

At the time of FBO in which the upper fan blade 58 and/or the lower fan blade 64 during the fan rotation fracture, the fan blade fragments generated by the fracture of the upper fan blade 58 and/or the lower fan blade 64 are thrown radially outward by the centrifugal force toward a part of the inner circumferential surface 52B of the fan shroud 52 corresponding to the opposing section A, and collide with the inner resin layer 72 in the opposing section A. Thereby, if a breakage such as a crack occurs in the inner resin layer 72, the fan blade fragments penetrate through the resin insulation sheet 78 and are stuck in the fiber layer 74 in the opposing section A to be captured by the fiber layer 74.

The fiber layer 74 in the opposing section A is not impregnated with resin and has high flexibility and elasticity derived from the physical properties of the woven fabric constituting the fiber layer 74, and therefore, the fiber layer 74 does not easily suffer brittle fracture and acts like a net to favorably capture the fan blade fragments. Thereby, it becomes unnecessary to increase the wall thickness of the fan shroud 52 to enhance the containment capability at the time of FBO, and the containment capability at the time of FBO is enhanced without hindering the weight reduction of the first ducted fan device 50. In the first embodiment, both sides of the fiber layer 74 are covered by the outer resin layer 70 and the inner resin layer 72, respectively, and the fiber layer 74 is not exposed to the outside, and thus, foreign matters are prevented from adhering to the fiber layer 74.

Figure 6:
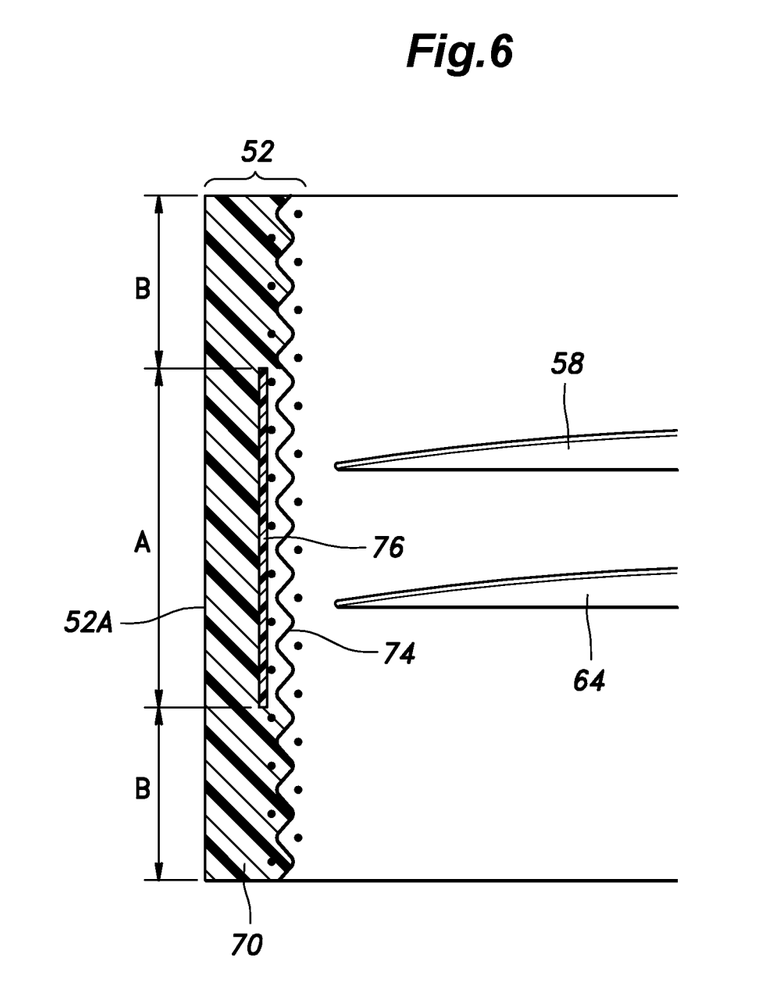
FIG. 6 is an enlarged sectional view of the main part of a ducted fan device according to the second embodiment.

The first ducted fan device 50 according to the second embodiment is described with reference to FIG. 6. Note that in FIG. 6, parts corresponding to those in FIG. 3 are denoted by the same reference signs as in FIG. 3 and the description thereof will be omitted.

In the second embodiment, the inner resin layer 72 in the first embodiment is omitted, and the fiber layer 74 is exposed on the inner circumferential surface of the fan shroud 52. Namely, the resin layer (the outer resin layer 70) is provided only on the radially outer surface of the fan shroud 52.

In the second embodiment, the fan blade fragments at the time of FBO are stuck directly in the fiber layer 74 in the opposing section A and are captured by the fiber layer 74, and due to the minimum laminated structure, the containment capability at the time of FBO is enhanced without hindering the weight reduction of the first ducted fan device 50.

In the second embodiment also, the fiber layer 74 in the opposing section A is not impregnated with resin and has high flexibility and elasticity derived from the physical properties of the woven fabric constituting the fiber layer 74, and therefore, the fiber layer 74 does not easily suffer brittle fracture and favorably captures the fan blade fragments. Thereby, it becomes unnecessary to increase the wall thickness of the fan shroud 52 to enhance the containment capability at the time of FBO, and the containment capability at the time of FBO is enhanced without hindering the weight reduction of the first ducted fan device 50. Since the inner resin layer 72 is omitted, breakage of the inner resin layer 72 will not be seen.

Figure 7:
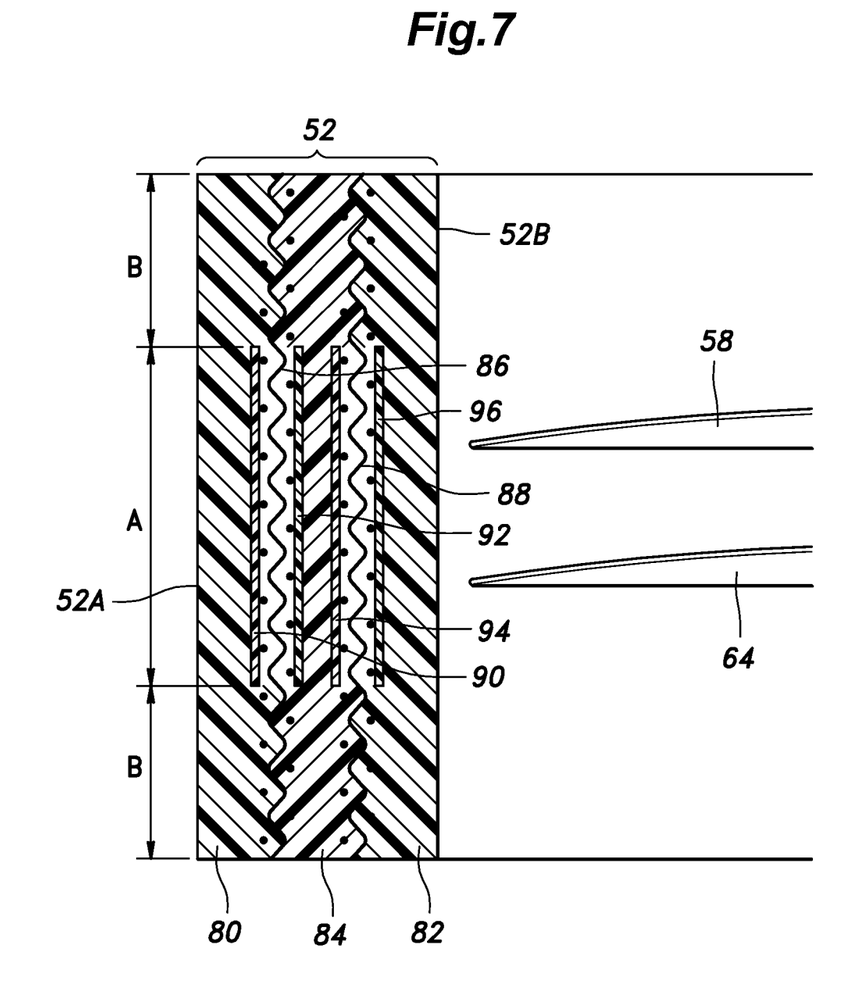
FIG. 7 is an enlarged sectional view of the main part of a ducted fan device according to the third embodiment.

The first ducted fan device 50 according to the third embodiment is described with reference to FIG. 7. Note that in FIG. 7, parts corresponding to those in FIG. 3 are denoted by the same reference signs as in FIG. 3 and the description thereof will be omitted.

In the third embodiment, the fan shroud 52 has a multilayer structure including an outer resin layer 80 constituting the outer circumferential surface 52A of the fan shroud 52, an inner resin layer 82 constituting the inner circumferential surface 52B of the fan shroud 52, an intermediate resin layer 84 disposed between the outer resin layer 80 and the inner resin layer 82, a fiber layer 86 sandwiched by the outer resin layer 80 and the intermediate resin layer 84, and a fiber layer 88 sandwiched by the inner resin layer 82 and the intermediate resin layer 84.

In the opposing section A, resin insulation sheets 90, 92, 94, 96 are disposed between the fiber layer 86 and the outer resin layer 70, between the fiber layer 86 and the intermediate resin layer 84, between the fiber layer 88 and the intermediate resin layer 84, and between the fiber layer 88 and the inner resin layer 82, respectively.

In the third embodiment, the fan blade fragments at the time of FBO break the inner resin layer 82 and are stuck in the fiber layer 88 in the opposing section A to be captured by the fiber layer 74. Even if the fan blade fragments pass through the fiber layer 74, the fan blade fragments break the intermediate resin layer 84 and are stuck in the fiber layer 86 in the opposing section A. Thus, the fan blade fragments are captured by either the fiber layer 74 or 76. Thereby, the containment capability at the time of FBO is even more improved.

Figure 8:
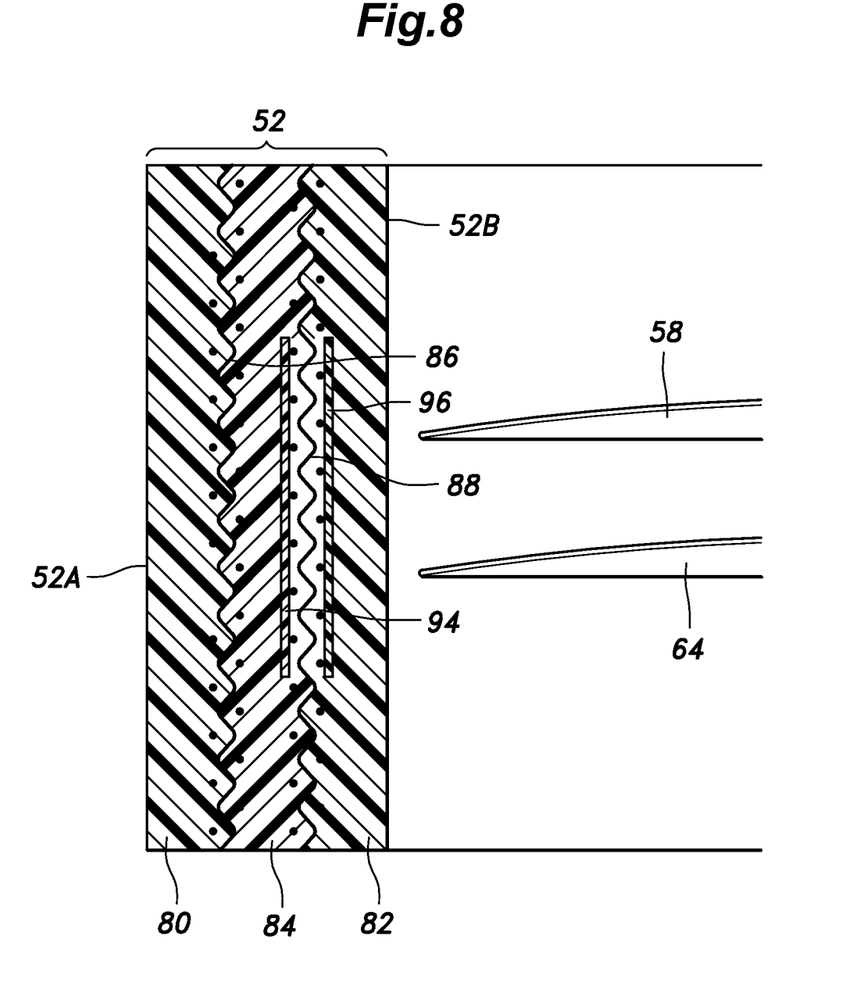
FIG. 8 is an enlarged sectional view of the main part of a ducted fan device according to the fourth embodiment.

The first ducted fan device 50 according to the fourth embodiment is described with reference to FIG. 8. Note that in FIG. 8, parts corresponding to those in FIG. 3 are denoted by the same reference signs as in FIG. 3 and the description thereof will be omitted.

In the fourth embodiment, unlike the third embodiment, the resin insulation sheets 90, 92 between the outer resin layer 80 and the intermediate resin layer 84 are not provided. The multilayer structure portion constituted of the outer resin layer 80, the fiber layer 86, and the intermediate resin layer 84 exhibits high rigidity in its entirety, whereby the strength of the fan shroud 52 is improved.

Note that, though not shown in the drawings, it is also possible to implement a laminated structure in which the resin insulation sheets 90, 92 are provided between the outer resin layer 80 and the intermediate resin layer 84 but the resin insulation sheets 94, 96 are not provided between the inner resin layer 82 and the intermediate resin layer 84.

Figure 9:
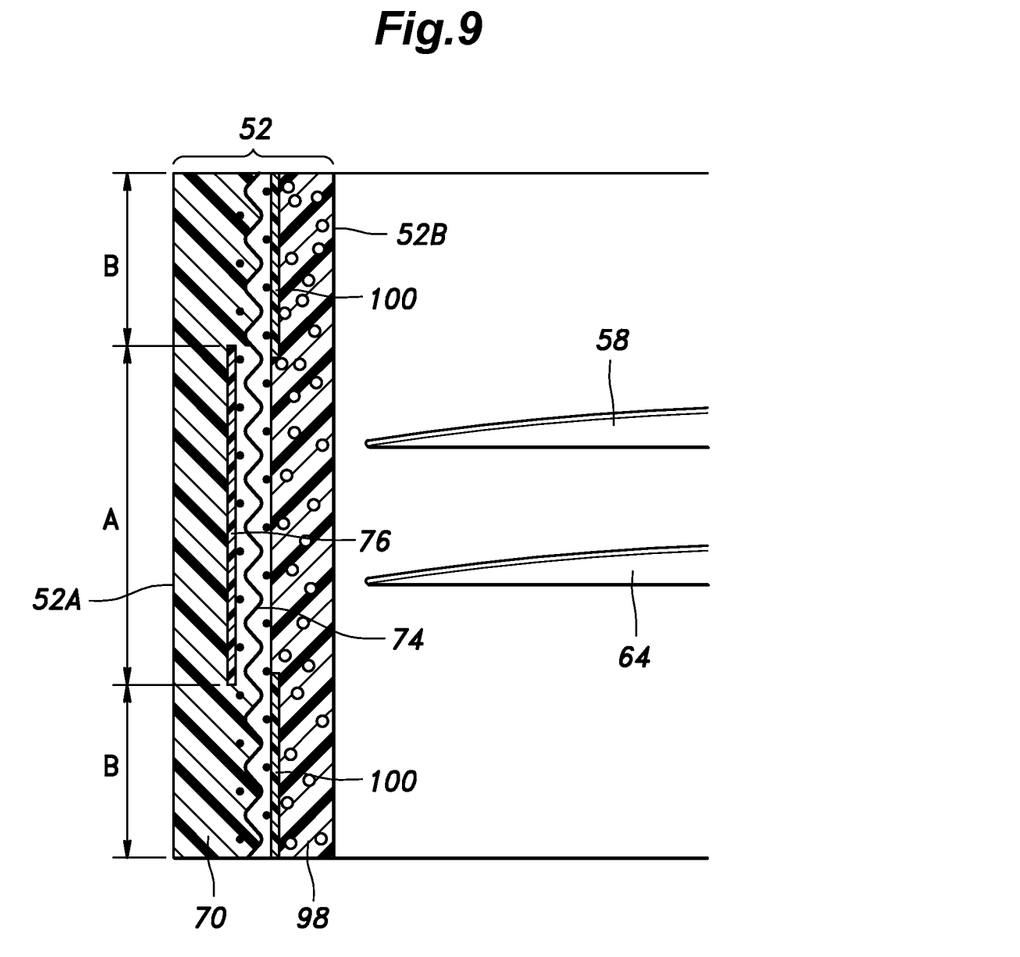
FIG. 9 is an enlarged sectional view of the main part of a ducted fan device according to the fifth embodiment.

The first ducted fan device 50 according to the fifth embodiment is described with reference to FIG. 9. Note that in FIG. 9, parts corresponding to those in FIG. 3 are denoted by the same reference signs as in FIG. 3 and the description thereof will be omitted.

In the fifth embodiment, an inner resin layer 98 is composed of a closed cell foamed resin such as polymethacrylimide resin (PMI). The inner resin layer 98 is pasted on the fiber layer, 74 in the non-opposing sections B by means of adhesive layers 100 each consisting of a film adhesive.

In the fifth embodiment, the fiber layer 74 in the opposing section A is not impregnated with the resin of the outer resin layer 70 and the inner resin layer 98 is not pasted thereon, and therefore, the fiber layer 74 in the opposing section A has high flexibility and elasticity derived from the physical properties of the fibrous material (woven fabric) constituting the fiber layer 74.

In the fifth embodiment, the fan blade fragments at the time of FBO break the inner resin layer 98 and are stuck in the fiber layer 74 in the opposing section A to be captured by the fiber layer 74. Thereby, it becomes unnecessary to increase the wall thickness of the fan shroud 52 to enhance the containment capability at the time of FBO, and the containment capability at the time of FBO is enhanced without hindering the weight reduction of the first ducted fan device 50.

The second ducted fan device 110 has a substantially same structure as the first ducted fan device 50, and therefore, the description of the second ducted fan device 110 is omitted.

In the foregoing, the present invention has been described in terms of the preferred embodiments thereof. However, the present invention is not limited to these embodiments, and may be modified appropriately within a range not departing from the spirit of the present invention.

For example, the fiber layer 74 not impregnated with resin in the opposing section A can be achieved without using the resin insulation sheet 76 or the like but by limiting the melting and curing of the outer resin layer 70 and the inner resin layer 72 when molding the fan shroud 52 to the non-opposing section B, for example.

Figure 10:
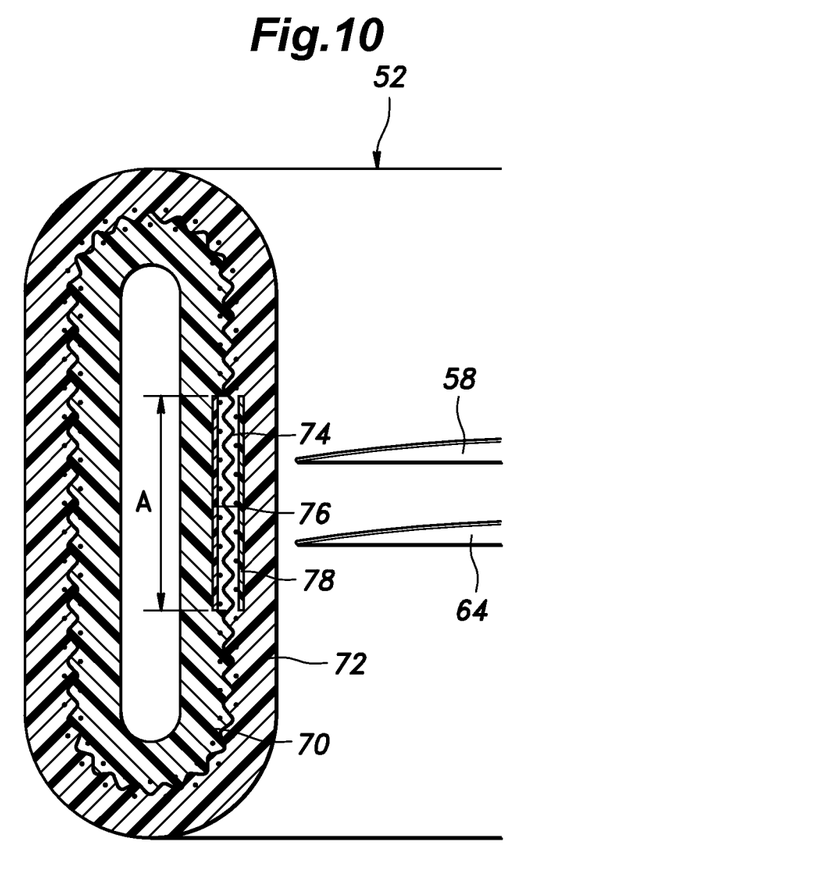
FIG. 10 is an enlarged sectional view of the main part of the ducted fan device according to another embodiment.

As shown in FIG. 10, the fan shroud 52 may have a hollow structure. In this case, the resin insulation sheets 76, 78 may be provided in only the opposing section A of the inner wall (the wall facing the upper fan blade 58 and the lower fan blade 64) of the hollow structure, while the other section may have a laminated structure constituted of the outer resin layer 70, the fiber layer 74, and the inner resin layer 72 without including the resin insulation sheets 76, 78. Thereby, compared to the case where the resin insulation sheets 76, 78 are provided in the section other than the opposing section A, the strength of the fan shroud 52 is improved.

Note that, though not shown in the drawings, it is also possible that the resin insulation sheets 76, 78 are provided in only the opposing section of the outer wall (on the opposite side from the side facing the upper fan blade 58 and the lower fan blade 64) of the hollow structure, while the other section has a laminated structure constituted of the outer resin layer 70, the fiber layer 74, and the inner resin layer 72 without including the resin insulation sheets 76, 78.

Not all of the structural elements shown in the foregoing embodiment are necessarily indispensable and they may be selectively adopted as appropriate without departing from the spirit of the present invention.

Glossary

10: multicopter
12: machine body
14: main machine body
16: front machine body
18: rear machine body
20: left machine body
22: right machine body
24: seat stand
26: occupant seat
28: grip
30: fixed handle
32: gyro sensor
34: acceleration sensor
36: flight control unit
38: autonomous flight control unit
40: legs
50: first ducted fan device
52: fan shroud
52A: outer circumferential surface 52B: inner circumferential surface
54: upper arm
56: upper electric motor
58: upper fan blade
60: lower arm
62: lower electric motor
64: lower fan blade
70: outer resin layer
72: inner resin layer
74: fiber layer
74A: warp
74B: weft
76: resin insulation sheet
78: resin insulation sheet
80: outer resin layer
82: inner resin layer
84: intermediate resin layer
86: fiber layer
88: fiber layer
90: resin insulation sheet
92: resin insulation sheet
94: resin insulation sheet
96: resin insulation sheet
98: inner resin layer
100: adhesive layer
110: second ducted fan device
A: opposing section
B: non-opposing section

The invention claimed is:

1. A ducted fan device comprising a fan shroud having an annular shape in plan view and an electric fan disposed at a center of the fan shroud and having a fan blade,
   wherein the fan shroud has a multilayer structure including at least one fiber layer and at least one resin layer, and has an opposing section including a part that opposes a tip of the fan blade and a non-opposing section that does not oppose the tip of the fan blade, the opposing section and the non-opposing section being arranged in an axial direction and the at least one fiber layer including a fiber layer extending in the axial direction continuously over the opposing section and the non-opposing section, and
   wherein in the non-opposing section, the fiber layer is impregnated with part of resin forming the resin layer, and in the opposing section, the fiber layer is not impregnated with the resin forming the resin layer.

2. The ducted fan device according to claim 1, wherein the resin layer is provided only on an outer side of the fiber layer in a radial direction of the fan shroud.

3. The ducted fan device according to claim 1, wherein the resin layer is provided on each side of the fiber layer.

4. The ducted fan device according to claim 1, wherein multiple fiber layers and multiple resin layers are provided alternately.

5. The ducted fan device according to claim 1, wherein the resin layer comprises a thermosetting resin.

6. The ducted fan device according to claim 1, wherein the resin layer is formed of a prepreg.

7. The ducted fan device according to claim 1, wherein, of the at least one resin layer, a resin layer disposed most inward in a radial direction of the fan shroud is formed of a foamed resin.

8. The ducted fan device according to claim 1, wherein the fiber layer consists of a plain or twill woven fabric made of at least one of polymer fibers and carbon fibers.

9. A ducted fan device comprising a fan shroud having an annular shape in plan view and an electric fan disposed at a center of the fan shroud and having a fan blade,
   wherein the fan shroud has a multilayer structure including at least one fiber layer and at least one resin layer, and has an opposing section including a part that opposes a tip of the fan blade and a non-opposing section that does not oppose the tip of the fan blade, the opposing section and the non-opposing section being arranged in an axial direction,
   wherein in the non-opposing section, the fiber layer is impregnated with part of resin forming the resin layer, and in the opposing section, the fiber layer is not impregnated with the resin forming the resin layer, and
   wherein a resin insulation sheet that inhibits impregnation of the resin into the fiber layer is disposed between the fiber layer and the resin layer in the opposing section.

* * * * *